United States Patent [19]

Fallas

[11] 4,356,906

[45] Nov. 2, 1982

[54] COLLATING UNIT FOR BAGGED PRODUCTS AND THE LIKE

[76] Inventor: David M. Fallas, 6906 Woodway, Waco, Tex. 76710

[21] Appl. No.: 189,319

[22] Filed: Sep. 22, 1980

[51] Int. Cl.³ .............................................. B65B 35/26
[52] U.S. Cl. ................................... 198/413; 198/462; 414/107
[58] Field of Search ............... 221/156, 171, 173, 175; 271/70, 72, 83, 178, 181, 216; 198/401, 412, 413, 460, 462; 414/107

[56] References Cited

U.S. PATENT DOCUMENTS

| | | | |
|---|---|---|---|
| 2,941,676 | 6/1960 | Harker | 198/412 X |
| 3,389,906 | 6/1968 | Walton | 271/70 |
| 3,445,980 | 5/1969 | Salomon | 414/107 X |
| 3,590,972 | 7/1971 | Mosterd | 198/412 |
| 3,729,085 | 4/1973 | Schlueter et al. | 198/412 X |

*Primary Examiner*—Stanley H. Tollberg

*Attorney, Agent, or Firm*—Arnold, White & Durkee

[57] ABSTRACT

Apparatus is disclosed for handling a succession of horizontally oriented bagged products, such as potato chips, arriving at the apparatus after a bagging operation. The apparatus includes a detection mechanism for detecting the arrival of each bag, upon which event the apparatus is activated. A series of flipper arms then move from a retracted position to contact the arrived bag and flip it upward and forward, to a substantially vertical orientation, after which the flipper arms retract and are repositioned below the bag-receiving surface, so as not to interfere with any incoming bag. A take-off belt is provided, and is synchronized with the flipper operation, so as to advance it an appropriate distance during part of the motion cycle of the flipper arms. This permits assembly of a column of vertically oriented bags, each in contact with the next. The operator can then remove the column of bags and easily transfer them to a packing carton.

9 Claims, 6 Drawing Figures

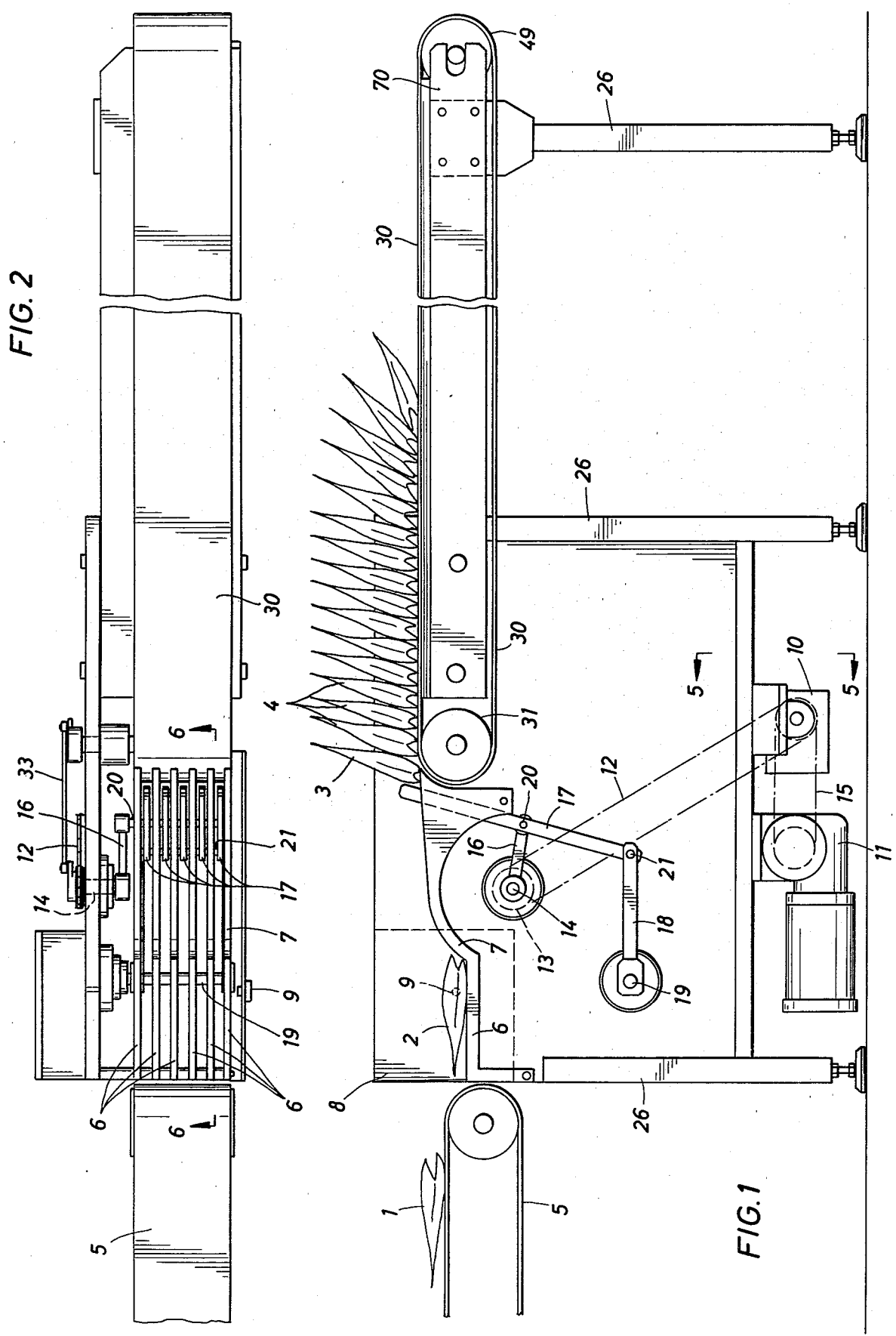

COLLATING UNIT FOR BAGGED PRODUCTS AND THE LIKE

FIELD OF THE INVENTION

This invention relates to mechanisms for achieving the correct orientation of articles having a somewhat irregular shape, as such articles are produced and packed for shipment. In particular, the invention is useful for the automatic orienting of sealed bags containing frangible products; for example, waxed paper or plastic bags containing potato chips.

BACKGROUND OF THE INVENTION

In the production and packing of bagged products, wherein the bagged product has a somewhat irregular geometry and may contain frangible products, such as potato chips, it is desirable to pack the bags in cartons in such a manner that the bags are in one or more columns of a particular number of vertically oriented bags. The bags should be adjacent to each other, without being so tightly compressed that undue breakage is apt to occur during packing or shipping of the product.

Bagged products, such as potato chips, commonly come off a bagging machine onto a conveyor belt with each bag lying horizontally on the belt, and space apart some distance from the next bag. It has been customary for workers to stand around a rotary packing table, and manually re-arrange the bags into vertical orientation and juxtaposition to other bags. The collected and arranged column of bags is then manually placed in a shipping carton.

The necessity for the worker to gather the bags together and correctly orient them has led to a number of difficulties. The first, of course, is the time required for such operations. The time required for manual orientation of the bags decreases productivity and/or increases labor costs. Moreover, the possibility of slippage of one or more of the bags, and the possibility of breakage of the contents due to handling of the bags, are additional troublesome factors.

In any successful attempt to automate the foregoing operations, several problems need to be recognized and addressed. First, the arrival time of the bags on the conveyor belt from the bagging machine is somewhat irregular, so it is necessary to provide some means for compensating for this irregularity. Second, any mechanism for vertically orienting the bags must take into account the breakable nature of the product within the bags, and handle them gently enough that undue breakage does not occur in the orientation process. Third, in the assembly of the bags in a column of vertically oriented bags, the bags need to be maintained adjacent to each other, but still not be pressed so close together that breakage of the contents will occur. Fourth, care must be taken that the orienting mechanism carries out its functions without interfering with the movement of succeeding bags coming from the bagging machine, and without damaging the contents of any bag which has arrived at the apparatus while the mechanism is in the process of orienting the preceding bag. These and other problems are recognized and overcome by the present invention.

SUMMARY OF THE INVENTION

In summary, the mechanism of the present invention is synchronized to the arrival of a bagged product; arrival of the product is optically or mechanically detected, and this detection in turn activates a "flipper" mechanism, which lifts the horizontally oriented bag from beneath, and turns it approximately 90 degrees, to an essentially vertical orientation. The vertically oriented bag is then placed on a take-off conveyor belt, motion of which belt may be intermittent and synchronized to the motion of the flipper mechanism by means of a ratchet assembly. In this manner, the take-off belt advances so as to provide enough space for the oncoming, vertically flipped bag. The provision of this space on the take-off belt assures that there will be enough room to deposit the incoming bag without breakage to its contents or the contents of earlier deposited bags, and also assures that there will not be so much space between bags on the take-off belt that the assembled column of bags will collapse.

In operation, the worker need only grasp the appropriate number of bags in a column, and transfer them to the shipping carton.

An important feature of the invention is that the flipper mechanism, once having deposited the vertically oriented bag in the column, retracts to a lower position, clear of any next incoming bag, and assumes a position ready to be actuated upon arrival of the next incoming bag.

The arrangement of the present invention has been found to achieve substantial convenience and speed, and to minimize breakage of the bagged products. Accordingly, enhanced assembly line productivity and labor savings result. Also, inspection of the products for date code and the like, is facilitated.

BRIEF DESCRIPTION OF THE DRAWINGS

The invention may be better understood by reference to drawings of the preferred embodiment thereof, wherein:

FIG. 1 is a side view of the overall mechanism.

FIG. 2 is a top view of the overall mechanism.

DETAILED DESCRIPTION OF THE PREFERRED EMBODIMENT

Figure 3:
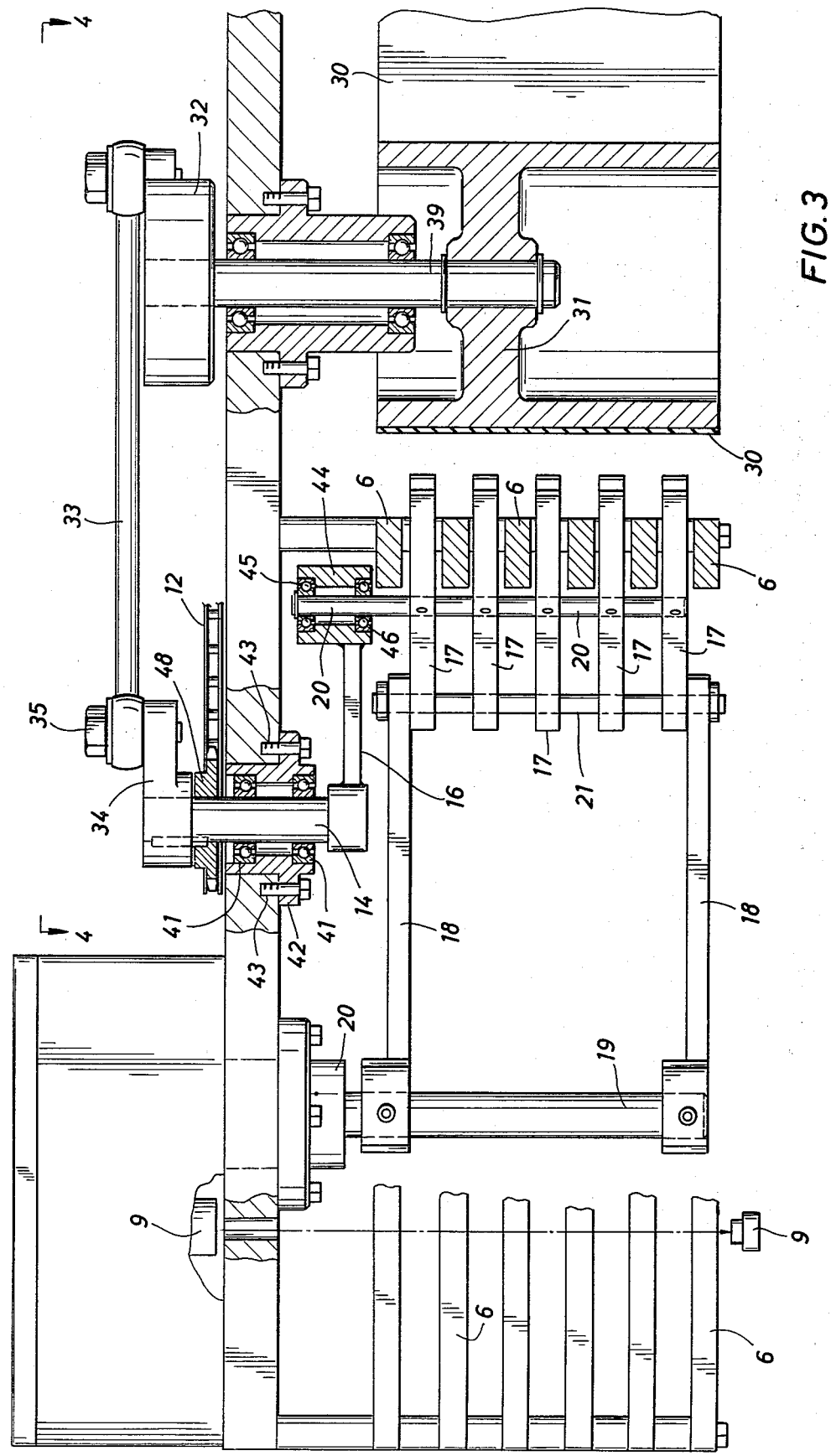
FIG. 3 is a cross-sectional view of portions of the movable parts of the mechanism.

It will be understood that the present invention can be implemented in a number of different ways, within the scope of the claims appended hereto. The presently preferred embodiment of the invention will now be described.

Referring now to FIG. 1 of the drawings, a series of bagged products 1, 2, 3 and 4 are shown. These bags may contain breakable products, such as potato chips. The products are bagged by a bagging mechanism, not shown, and deposited on input conveyor belt 5. As seen in FIG. 1, incoming bag 1 is lying on belt 5 in a substantially horizontal orientation. The input belt 5 deposits the bag as shown in the position of bag 2, on a support structure 6. The support structure 6 has an upwardly curving end portion 7, which forms a stop structure, so that movement of the incoming bag will be arrested at substantially the position shown for bag 2. To the sides of support structure 6 are mounted control housings 8, which contain instrumentation for generating an optical beam just above the support structure 6, and a photoelectric detection mechanism 9, of conventional design, to detect the arrival of the bag 2. An electrical signal is generated by this mechanism, to denote the presence of bag 2 at the incoming or receiving location on the support structure 6. Alternatively, this signal could be actuated mechanically, by a weight-sensitive switch or the like.

The electrical signal generated by the detection mechanism 9 is used to activate a clutch 10, which is powered by an electric motor 11 or other suitable driving means. The clutch 10 is a single-revolution type, so that upon each activation by a signal from the detection mechanism 9, the clutch will make one revolution. As shown in FIG. 1, the apparatus is shown in the position where the clutch 10 has just been activated. Clutch 10 is connected via the driving chain 12 to a driven sprocket 13, which is fixed to a rotatable shaft 14. The shaft 14 will be referred to herein as the driven shaft.

Figure 6:
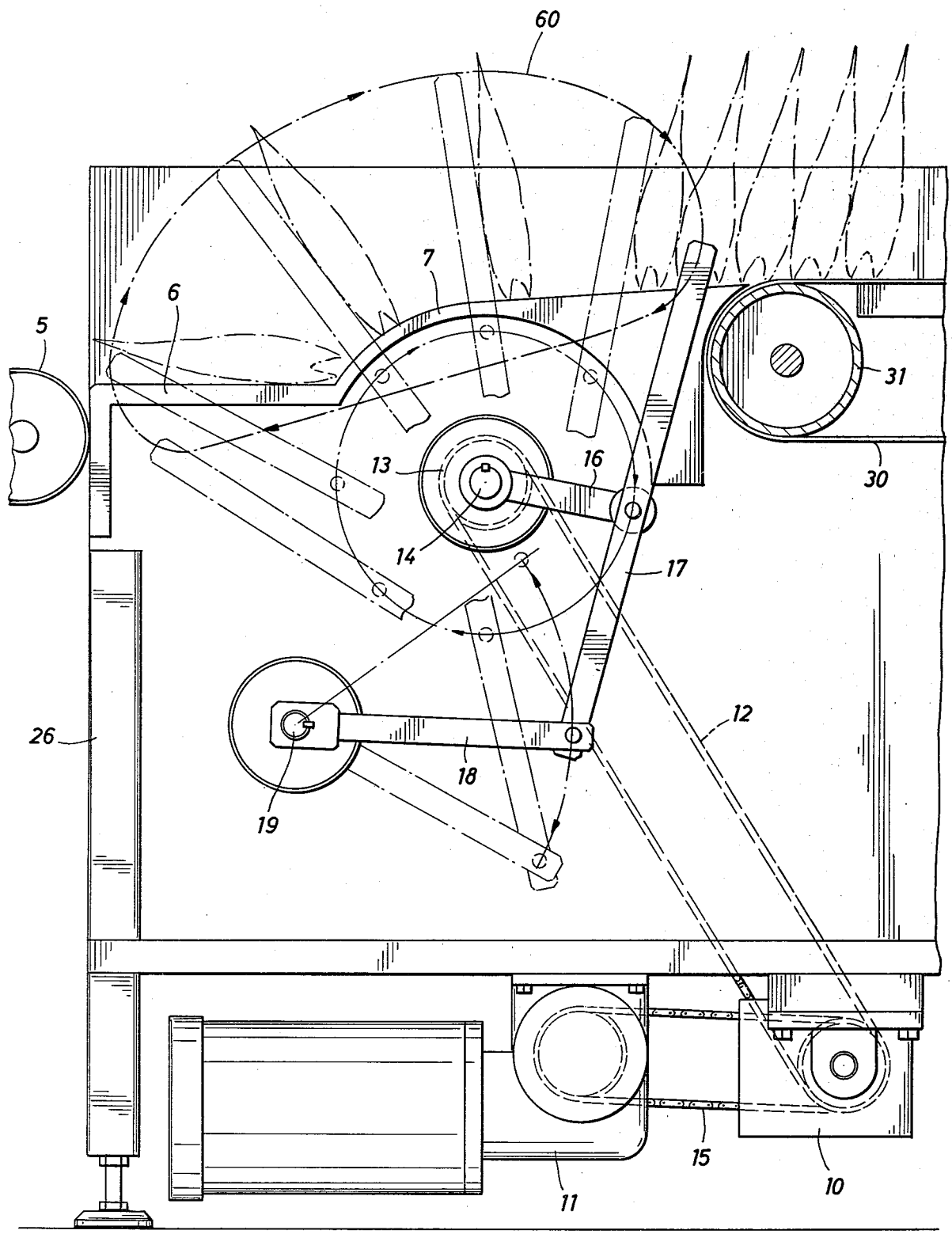
FIG. 6 is a side view of the mechanism, showing the locus of the flippers as they orient the bagged products.

Attached to the driven shaft 14 is a rotating arm 16, to which is attached a rotatable extension shaft 20, to which in turn are attached a series of pusher arms 17. From the position of pusher arms 17 as shown in FIG. 1, it is desirable to retract the arms 17 downward, and then bring them into position under the bag 2, without contacting the bag 2 prematurely. To accomplish this function, a pair of idler arms 18 are provided, rotatably attached to idler shaft 19. In this manner, the idler arms 18 rotate up and down about 45 degrees from the horizontal position shown, during a complete cycle of the pusher arms 17, constraining the pusher arms 17 to a position below the top surface of the support structure 6 when they are not being used to orient a bag. Upon engagement of the one-revolution clutch 10, the driven shaft 14 and the extension arm 16 are rotated through one complete clockwise revolution. This initially moves the pusher arms 17 in a generally downward direction during approximately the first half of the cycle, and in a generally upward and rightward direction during the second half of the cycle, as will be more fully explained below in connection with FIG. 6 of the drawings. It is to be pointed out here that the motion of pusher arms 17 is such that they will always engage the horizontal bagged products from underneath, and rotate them upward and rightward (as viewed in the drawing of FIG. 1), to a location on take-off belt 30. Provision of enough space to accommodate a bag in the position illustrated for bag 3 in FIG. 1, is assured by the synchronized movement of the take-off belt 30 and the flipper arms 17, as will be described below in connection with FIG. 4 of the drawings.

In FIG. 1 of the drawings, it is seen that the entire mechanism is supported by adjustable-height vertical supports 26.

Referring now to FIG. 2 of the drawings, a plan view of the preferred embodiment is shown, without the bagged products which were shown in FIG. 1. In FIG. 2, the support structure 6 for incoming bags is seen to have a combed or leaved configuration of spaced-apart elements. This combed configuration is continued into the curved, raised portions 7 which form the stop structure as above described. The purpose of the combing configuration is to permit the pusher arms 17 to move between the spaced-apart elements of the support structure 6, and between the spaced-apart elements of the raised portion 7 of the support structure.

Referring now to FIG. 3 of the drawings, the pusher arm mechanism is shown in somewhat more detail, again in plan view. Here, the pusher arms 17 are in the same orientation as shown in FIG. 1, i.e., just after a vertically oriented bag has been deposited on the take-off belt 30. Chain 12 is shown engaged with a sprocket 48 attached to the driven shaft 14. Rotating arm 16, which is fixedly mounted to the driven shaft 14, is shown with its distal end connected to a housing 44 containing bearings 45 and 46, in which is journalled the shaft 20. The pusher arms 17 are fastened to the shaft 20 so as to move therewith.

The pair of idler arms 18 are shown, mounted on the idler shaft 19. The idler arms 18 may be either fixedly mounted to the shaft 19 as shown, or, alternatively, may be rotatably mounted thereon, in which case shaft 19 need not be rotatable.

Considering next the operation of the take-off belt 30, and returning to FIG. 1 of the drawings, it is seen that take-off belt 30 is mounted on drums 31 and 40. Drum 49 is rotatably mounted in the machine frame 70 as shown, and is not driven, but rotates with the belt 30.

Figure 4:
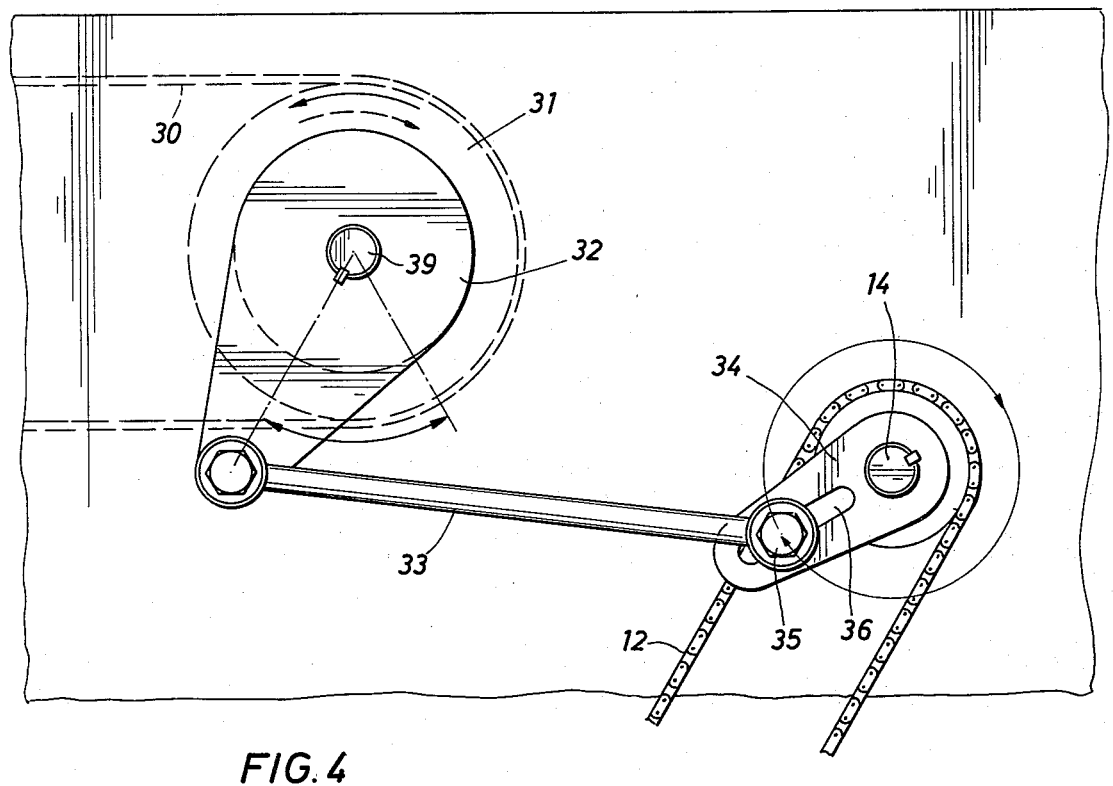
FIG. 4 is a side view of the intermittent drive mechanism for the take-off conveyor belt.

The operation of drum 31 is best understood by reference to FIG. 4 of the drawings. Drum 31 is mounted on a common shaft 39 with a ratchet mechanism 32. The ratchet is set such that drum 31 can be rotated only in the counterclockwise direction. Whenever ratchet mechanism 32 is moved in the clockwise direction, it rotates freely and does not turn drum 31, and hence does not advance the take-off belt 30. Rotatably connected to the ratchet mechanism 32 is a connecting arm 33, which in turn is adjustably fastened to a rotating arm 34 by means of adjusting nut 35. Rotating arm 34 is fixedly connected to the driven shaft 14 described above with reference to FIG. 1, and contains a slotted portion 36 to permit adjustment of the distance through which connecting arm 33 will move as arm 34 rotates with driven shaft 14. This adjustment therefore determines the distance through which take-off belt 30 will be advanced during each rotation of driven shaft 14. It will be recalled that for each actuation cycle of the apparatus, driven shaft 14 is rotated once by means of the single-revolution clutch 10 (FIG. 1). The adjustment in slot 36 of the rotating arm 34 is chosen so that drum 31 will be turned just far enough in a counterclockwise direction to provide enough space on take-off belt 30 for placement of one bag of product thereon. Connecting arm 33, instead of the integral unit shown in the drawing, may be made in several threaded sections, fastened by adjustable joints, so that the length of the arm may be varied.

Returning to FIG. 1, a bag 3 is seen at a time when the rotation of drum 31 is still being accomplished in the cycle, so that space for the bag 3 is being made on take-off belt 30. Complete retraction of the pusher arms 17 will not occur until the bag 3 is safely deposited on take-off belt 30. In this connection, note that the angle of pusher arms 17 as shown in FIG. 1 is such that the bag 3 is given a slight angular tilt off the true vertical, in the direction of movement of take-off belt 30. This angle assures that the bag 3 will not fall back when the pusher arms 30 are fully retracted and are no longer in contact with the bag. Additionally, it may be desirable to provide serrations on the exit portion of the support structure, to prevent backward falling of the bag.

Figure 5:
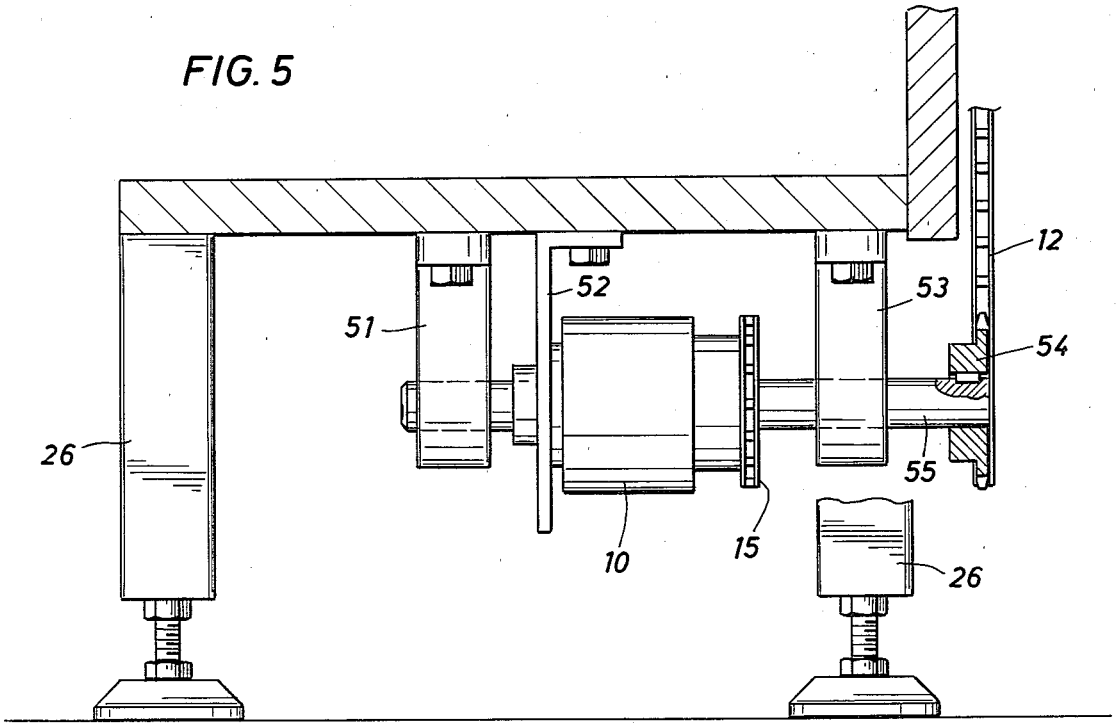
FIG. 5 is a front view of the drive and clutch portions of the mechanism.

Turning now to FIG. 5 of the drawings, the clutch mechanism 10 is shown in somewhat more detail. The clutch 10 is supported by shaft 55, which in turn is supported by bearings 51 and 53. The drive chain 12 is connected to a sprocket 54, mounted on the clutch driven shaft 55.

Having thus described the preferred embodiment of the invention, the motion of pusher arms 17 may now be observed through a complete cycle of operation of the apparatus. The line 60 is the approximate locus of the tips of pusher arms 17 as they move through one complete revolution of driven shaft 14. It will be seen that the arrangement of arms 16, 17 and 18 is such that the pusher arms 17 are retracted after they have placed a bag on take-off belt 30, and that they remain below the top surface of support structure 6 until the next actuation cycle is begun by the arrival of a bag on the support structure 6.

It will be recognized that many alternative embodiments of the present invention might be devised, within the coverage of the claims appended hereto. By way of example, drum 31 and ratchet assembly 32 could be driven directly from the clutch 10, rather than indirectly by connection to the driven shaft 14 as shown. Another possible modification is to use, in lieu of the intermittent take-off belt drive through ratchet assembly 32, a chain drive operated by rotation of driven shaft 14, or by clutch 10. There is, however, some disadvantage to that arrangement, in that the motion of belt 30 would be continuous throughout the entire cycle of driven shaft 14 and clutch 10. This would mean that at the arrival time of a bag at take-off belt 30 would occur when the advancement of take-off belt 30 is not yet complete. Insufficient room would be provided for depositing the bag on take-off belt 30. This might lead to some breakage of the product in the bag, due to pressing by flipper arms 17.

A third possible alternative arrangement would be wherein the clutch 10 does not advance an entire revolution on each actuation. Instead, a lesser or greater clutch rotation might be used, and a gearing arrangement could be employed to impart the correct amount of rotation to driven shaft 14 during each cycle. Therefore, various kinds of clutch and drive arrangements might be employed, within the purview of the present invention. The stroke of the ratchet assembly might be made to be adjustable during operation of the machine.

Persons skilled in the art will perceive additional modifications and embodiments of the invention.

As used in this specification and in the appended claims, it should be understood that the word "connect," or a derivative thereof, implies not only a direct, immediate connection between two recited parts, but also embraces the various arrangements wherein the parts are operatively connected, althrough other elements may be physically located between the connected parts. Further, the word "a" does not preclude the presence of a plurality of elements accomplishing the same function. For example, "an" idler arm should be understood to include either a single idler arm, or the pair of arms carrying out the same function, such as illustrated at 18 in FIG. 3 of the drawings.

I claim as my invention:

1. Apparatus for orienting a plurality of articles arriving at said apparatus, comprising:
   (a) a support structure for sequentially receiving said articles, said support structure comprising a plurality of spaced-apart elements;
   (b) means for producing an actuation signal in response to the presence of an article on said supporting structure;
   (c) a clutch operable in response to said actuation signal and powered by driving means;
   (d) a driven shaft, rotatable by said clutch;
   (e) a rotating arm connected to said driven shaft and oriented transversely to the axis of said driven shaft;
   (f) a flipper arm rotatably connected to said rotating arm, for contacting said article by passing through the space between said spaced-apart elements of said support structure, and for lifting said article to a substantially vertical position juxtaposed to other such articles;
   (g) means for retracting said flipper arm below the level of said support structure, and for retaining said flipper arm below said support structure until the next occurrence of said actuation signal; and
   (h) a curved, raised portion operatively associated with said support structure for arresting motion of an incoming article; said raised portion being shaped and disposed to guide and support the article when lifted by the flipper arm to a vertical position.

2. Apparatus for orienting a plurality of articles arriving at said apparatus, comprising:
   (a) a support structure for sequentially receiving said articles, said support structure comprising a plurality of spaced-apart elements;
   (b) means for producing an actuation signal in response to the presence of an article on said supporting structure;
   (c) a clutch operable in response to said actuation signal and powered by driving means;
   (d) a driven shaft, rotatable by said clutch;
   (e) a rotating arm connected to said driven shaft and oriented transversely to the axis of said driven shaft;
   (f) a take-off belt;
   (g) a flipper arm rotatably connected to said rotating arm, for contacting said article by passing through the space between said spaced-apart elements of said support structure, and for lifting said article to a substantially vertical position juxtaposed to other such articles on said take-off belt;
   (h) means for retracting said flipper arm below the level of said take-off belt, and for retaining said flipper arm below said support structure until the next occurrence of said actuation signal;
   (i) at least one rotatable drum in moving contact with said take-off belt; and
   (j) means for driving said drum a predetermined distance in response to said actuation signal; said means including adjustment means for selectively adjusting the distance of advancement of said drum.

3. The apparatus of claim 3, wherein said support structure includes a curved, raised portion for arresting motion of an incoming article.

4. The apparatus of claim 2, wherein said drum-driving means comprises:
   (a) a ratchet assembly connected to said drum, for rotating said drum in one angular direction only;
   (b) a second rotating arm connected to said driven shaft and positioned transversely to the axis of said driven shaft; and
   (c) a connecting arm rotatably affixed to said ratchet assembly and to said second rotating arm, for imparting motion to said ratchet assembly in opposite angular directions, alternately.

5. The apparatus of claim 4, wherein said adjustment means comprises means for adjusting the distance of movement of said connecting member and of said ratchet assembly, thereby providing a predetermined distance of advancement of said take-off belt in response to each occurrence of said actuation signal.

6. Apparatus for orienting a plurality of articles arriving at said apparatus, comprising:
   (a) a support structure for sequentially receiving said articles, said support structure comprising a plurality of spaced-apart elements;
   (b) a motor;
   (c) a shaft driven by said motor;
   (d) a rotating arm connected to said driven shaft and oriented transversely to the axis of said driven shaft;
   (e) a take-off belt;
   (f) a flipper arm rotatably connected to said rotating arm, for contacting said article by passing through the space between said spaced-apart elements of said support structure, and for lifting said article to a substantially vertical position juxtaposed to other such articles on said take-off belt;
   (g) means for retracting said flipper arm below the level of said take-off belt and returning said flipper arm to the location of said support structure; and
   (h) a curved, raised portion operative associated with said support structure for arresting motion of an incoming article; said raised portion being shaped and disposed to guide and support the article when lifted by the flipper arm to a vertical position.

7. The apparatus of claim 6, further comprising:
   (a) at least one rotatable drum in moving contact with said take-off belt; and
   (b) means for driving said drum in synchronism with said driven shaft.

8. The apparatus of claim 1, further comprising a take-off belt.

9. The apparatus of claim 3 wherein said raised portion is shaped and disposed to guide the article when lifted by the flipper arm to a vertical position.

* * * * *